United States Patent [19]

Hata et al.

[11] 4,339,817
[45] Jul. 13, 1982

[54] CLOCK RECOVERY CIRCUIT FOR BURST COMMUNICATIONS SYSTEMS

[75] Inventors: Masaharu Hata, Yokosuka; Kotaro Kato, Tokyo, both of Japan

[73] Assignees: Nippon Electric Co., Ltd.; Nippon Telegraph & Telephone Public Corporation, both of Tokyo, Japan

[21] Appl. No.: 183,333

[22] Filed: Sep. 2, 1980

[30] Foreign Application Priority Data

Sep. 3, 1979 [JP] Japan .................................. 54-112544

[51] Int. Cl.³ .......................... H04L 7/00; H04J 3/06; H04J 6/00
[52] U.S. Cl. ..................................... 370/93; 370/103; 375/107
[58] Field of Search ...................... 370/47, 49, 93, 100, 370/103, 104, 106; 375/107, 118, 119; 455/51; 340/147 SY, 825.2

[56] References Cited

U.S. PATENT DOCUMENTS 3,676,599 7/1972 Heetman .............................. 370/100
3,940,558 2/1976 Gabbard et al. ..................... 375/107

OTHER PUBLICATIONS

"The Design of a PSK Modem for the Telesat TDMA System", S. Yokoyama et al. (Nippon Electric Co. Ltd., Japan) pp. 44-11 to 44-15.
"Communications Satellite Systems"-J. Martin; Time-Division Multiple Access, pp. 243-246.

Primary Examiner—Benedict V. Safourek
Attorney, Agent, or Firm—Laff, Whitesel, Conte & Saret

[57] ABSTRACT

A clock recovery circuit includes an oscillator having a frequency which is substantially equal to the clock frequency of bursts which are transmitted from a plurality of stations. A phase difference detector circuit responds to phase differences between clock signals extracted from each of the bursts and from the output from the oscillator. An averaging circuit averages the detected phase differences over an interval which is designated by a first control signal. A memory circuit stores the averaged phase difference in response to a second control signal and reads out the stored phase differences in response to a third control signal. A control circuit generates the first to third control signals in response to the output from the oscillator. A phase shift circuit shifts the phase of the output from the oscillator, based on the phase difference read out from the memory circuit. This generates and recovers the original clock pulse signal. The clock of the first burst corresponding to the stored phase difference is used as the clock for a second burst from the same station which transmits the first burst.

4 Claims, 13 Drawing Figures

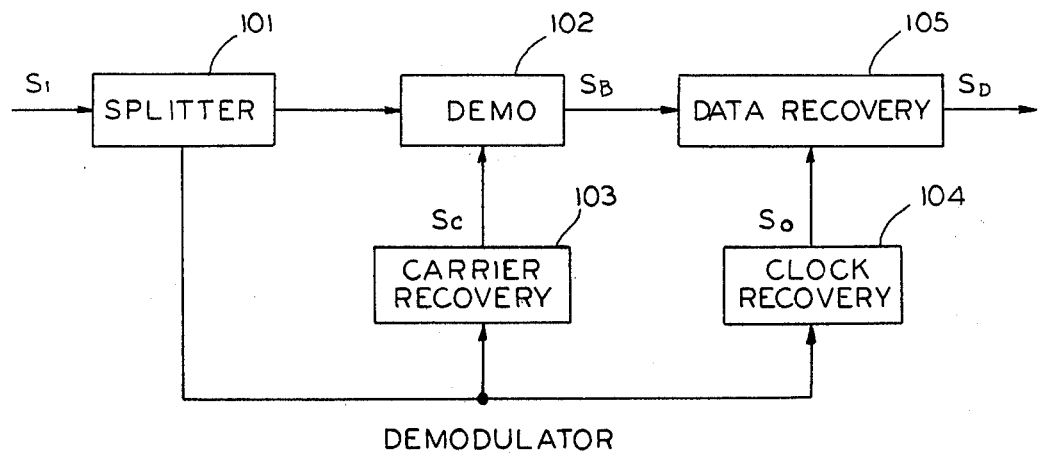
FIG. 1
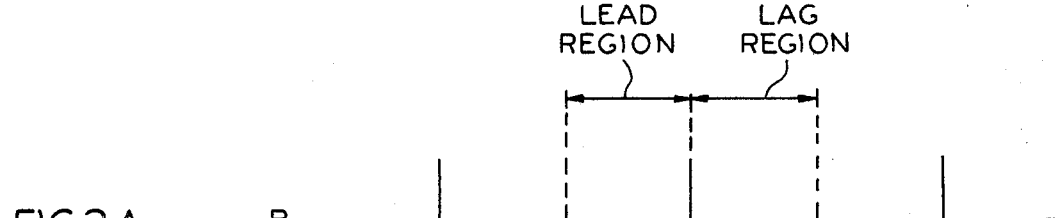
FIG. 3A
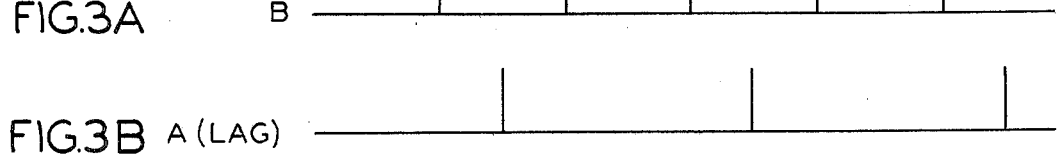
FIG. 3B  A (LAG)
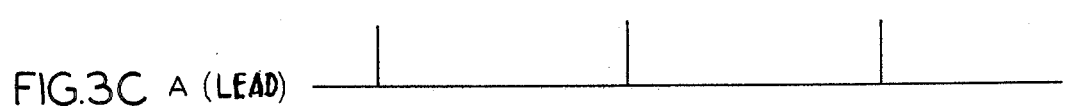
FIG. 3C  A (LEAD)

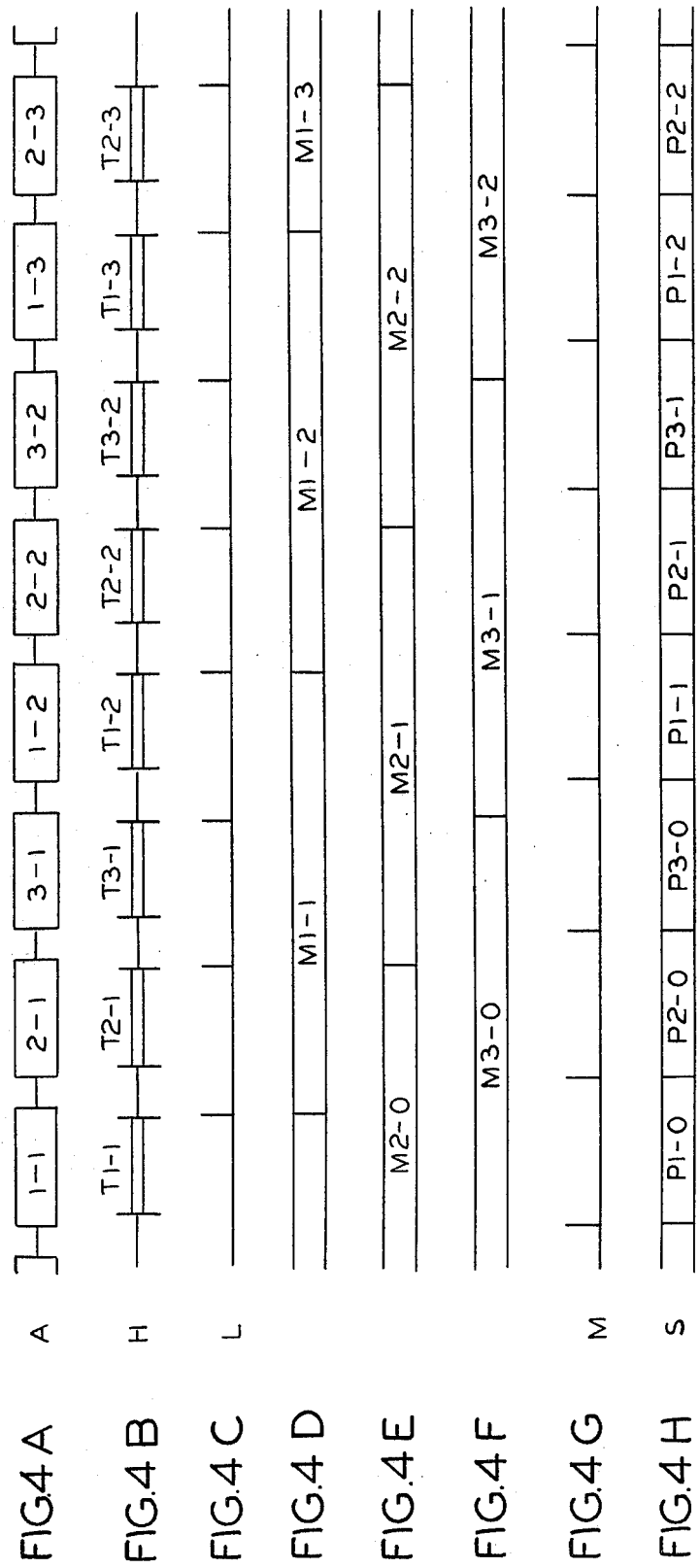

CLOCK RECOVERY CIRCUIT FOR BURST COMMUNICATIONS SYSTEMS

The present invention relates to a clock recovery unit for use in a burst communications system, such as time-division multiple access (TDMA) system.

The receiver side of a TDMA communications system, for example, receives bursts which are sequentially transmitted from a plurality of stations. In many cases, the clock frequencies of these bursts do not coincide with each other. Even when the frequencies do match with each other, the distances between the stations are not constant. For instance, it is impossible to maintain a constant distance in TDMA system used in mobile communications since one of the stations is moving. Also, the clocks of bursts are usually not synchronized. The receiver side, therefore, is obliged to recover clocks responsive to every burst and to correct any errors in frequency and phase, in order to obtain clock pulses which are synchronized with each burst. Reference should be made to Chapter 16 "Time-Division Multiple Access", pp. 243-256 of "COMMUNICATIONS SATELLITE SYSTEMS", Prentice-Hall, 1978 for more information on the subject.

In a conventional clock recovery circuit, the frequency and phase corrections are achieved by relaying on a single tuning circuit or phase-locked loop (PLL), which requires a transient response time for correction. The clock component extracted from received burst signals, in many cases, contains unnecessary components such as the thermal noise, etc. Therefore, it is necessary to improve the S/N of the recovered clock pulses a narrower frequency band width of the single tuning circuit or PLL.

The transient response time is inversely proportional to the band width, so that the band width which has been narrowed for improving S/N has increased transient response time. During such a response time, the clock pulses are not sufficiently recovered and therefore data can not be demodulated, thus deteriorating the line efficiency. In other words, the clock pulse recovery faces the conflicting problems of improving the S/N of the recovered clock pulses and of improving the line efficiency. It is not easy to satisfy both of these two demands. Thus, the conventional clock recovery circuit seemingly has these inherent problems.

The object of the present invention is to provide a clock pulse recovery circuit which obviates such difficulties, eliminates the transient response time, and which may arbitrarily improve the S/N.

In the clock pulse recovery circuit, in accordance with the present invention, we note the extremely small phase deviation of clock pulse timings of the bursts which are transmitted from the same station. These clock pulses arrive at substantially the same time. By using the clock pulses recovered from the timing information of the preceding burst, as the sampling signal for the ensuing burst, the invention eliminates the transient time required for clock pulse recovery in the conventional device. At the same time, the clock pulse recovery circuit of the present invention averages the timing data obtained from the preceding burst and imparts a filter characteristic equivalent to that of the narrow band, thereby improving the S/N of the recovered clock pulses.

According to the present invention, a clock pulse recovery circuit includes an oscillator having a frequency which is substantially equal to the clock frequency of the bursts transmitted from a plurality of stations. A detector circuit detects phase differences between clock signals extracted from each of the bursts and the output from the oscillator. An averaging circuit averages the detected phase differences for an interval designated by a first control signal. A memory circuit stores the averaged phase difference in response to a second control signal and reads out the stored phase differences in response to a third control signal. A control circuit generates the first to third control signals in response to the output from the oscillator. A phase shift circuit shifts the phase of the output from the oscillator based on the phase difference read out from the memory circuit, and thereby generating a train of recovered clock pulses. The clock pulses of the first burst, corresponding to the stored phase difference, are used as the clock pulses for a second burst received from the same station which transmits the first burst.

The present invention is explained in further detail referring to the drawings, wherein:

FIG. 1 is a block diagram illustrating the principal part of the demodulator section on the receiving side in a burst communication system;

FIGS. 3A to 3C and 4A to 4H are diagrams to explain the timing of the operation shown in FIG. 2.

Figure 2:
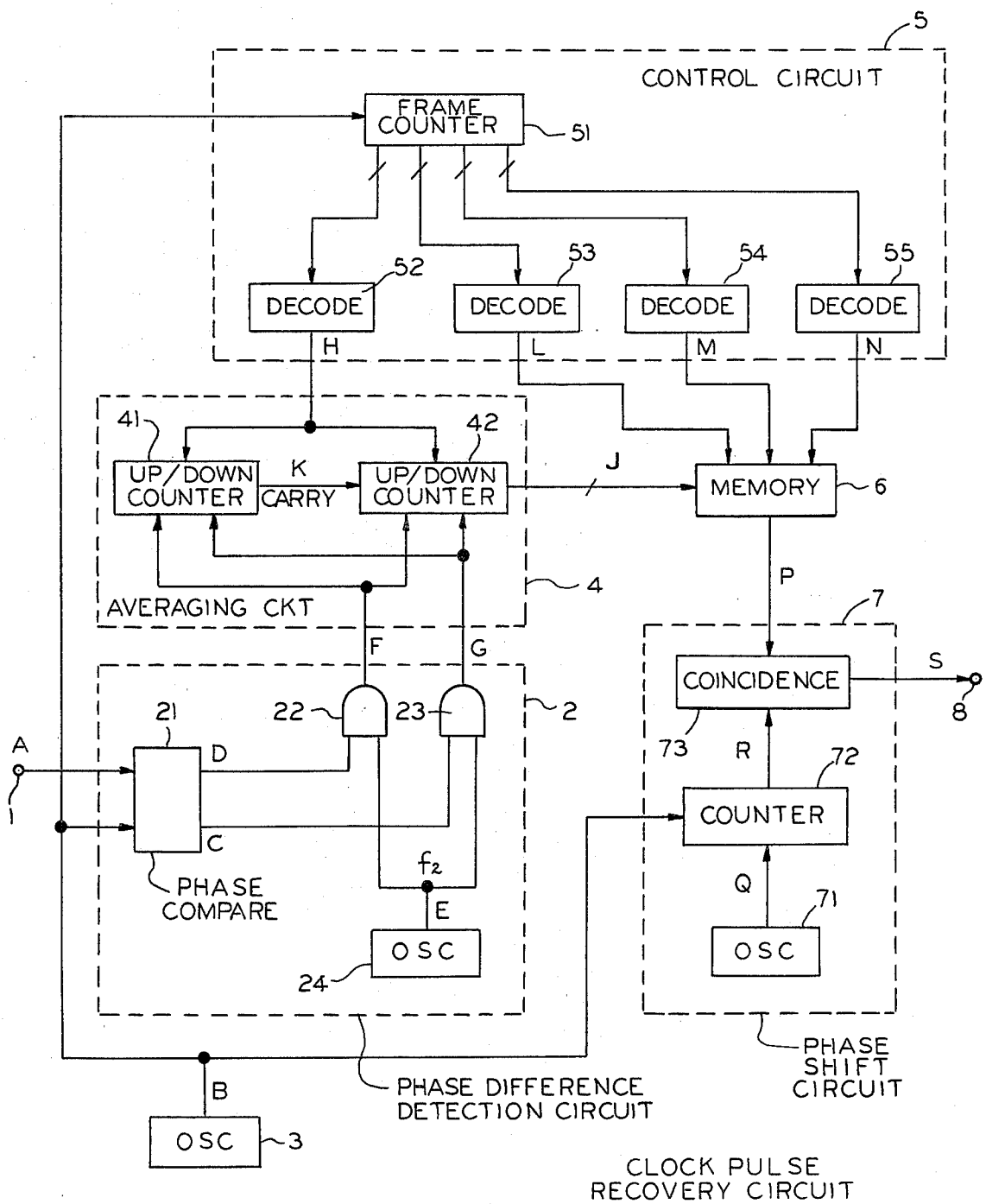
FIG. 2 is a block diagram illustrating an embodiment of the clock pulse recovery circuit, in accordance with the present invention.

In FIG. 1, a received modulated wave $S_i$ is split by a splitter circuit 101, and supplied to a demodulating circuit 102, carrier recovery circuit 103, and clock pulse recovery circuit 104. The demodulator circuit 102 synchronously detects the received modulated signal $S_i$ with a receiverd carrier $S_c$ supplied from the carrier recovery circuit 103, and then supplies a base-band signal $S_B$, as its output. A data recovery circuit 105 recognizes the base-band signal $S_B$ in conformity with the timing of a recovered clock pulse $S_O$ delivered by the clock recovery circuit 104, and thereby produces data $S_D$. A demodulator, such as the one illustrated in FIG. 1, is described, with reference to a quadraphase PSK modulated wave, in an article, S. Yokoyama et al, "The Design of a PSK MODEM for the Telesat TDMA System", ICC 75, June 16-18, San Francisco.

In FIG. 2, a signal A containing clock components supplied from an outside source, is received at, a signal input terminal 1 and becomes one of the input signals at a phase comparator 21 in a phase difference detection circuit 2. With a TDMA system, for example, the input clock components are extracted from the bursts as they are received from a plurality of independent stations. An output B of an oscillator 3 is supplied to the other input of the phase comparator 21. The frequency ($f_1$) of the oscillation output B is equal or extremely close to the frequency of the input signal A.

The phase difference detection circuit 2 has an output reflecting the phase difference between the input signal A containing a clock component and the oscillator output B. The output is supplied to an averaging circuit 4 in the following manner, at each clock timing. The phase comparator 21 generates a lagging signal D and leading signal C corresponding to the lagging and leading regions illustrated in FIG. 3A and proportional to the phase difference between the two signals. The reference for determining whether a signal is lagging or leading is determined by the oscillator output B. FIG. 3B illustrates where the input signal A is lagging behind the signal B whereas FIG. 3C shows the signal as leading signal B. The lagging signal D is led to a gate 22 and the leading pulse signal C to a gate 23, respectively to gate out an output E of an oscillator 24. The frequency f$_2$ for the output E is set at:

$$f_2 = N_1 \cdot f_1$$

where: f$_1$ is the frequency of the oscillator 3 and N$_1$ is a positive integer. With the construction of the phase difference detection circuit 2, the outputs F and G from the gates 22 and 23 contain a number of pulses which are, respectively, proportionate to the lagging or the leading amounts.

In the present embodiment, both the lagging and leading are limited to the maximum, $\pi$. Accordingly, the number of pulses from the outputs F and G do not exceed N$_1$/2, at the maximum.

The averaging circuit 4 averages the phase difference pulses (pulses of the signal F or G) for a predetermined interval which is designated by a control signal H received from a control circuit 5. Averaging circuit 4 supplies signal J, which represents the number of the average phase differences, to a memory circuit 6. The averaging circuit 4 may be comprised of two up-down counters 41 and 42. The counter 41 has a period of N$_2$, N$_2$ being a positive integer representing the number of intervals of the clock timings to be averaged. The counter 42 also has a period of N$_1$ and is connected to the counter 41 by the carry-up signal K. A counter which has a period of N$_2 \cdot$N$_1$ is obtained from these counters.

These two counters are reset immediately before the clock interval N$_2$ which is to be averaged responsive to the control from the control circuit 5. After reset, counting starts from the initial value zero. Therefore, counting may be started, for instance, when the lagging signal F is input. Counting goes up as 0, 1, 2, 3 ..., even after the clock averaging period N$_2$ passes. The total count does not exceed a value given by:

$$N_2 \cdot (N_1/2)$$

Conversely, when the leading signal G is the input, the counter counts down from the initial value 0 to N$_2 \cdot$N$_1-1$, N$_2 \cdot$N$_1-2$, N$_2 \cdot$N$_1-3$, ...; and the total count does not go down beyond:

$$N_2 \cdot (N_1/2)$$

Accordingly, when N$_1$ is selected to be $2^a$ (wherein a is a positive integer) as in N$_1 = 2^5$ and N$_2 = 2^8$, it is possible to judge whether signal E is lagging or leading by seeing whether the most significant digit (abbreviated as MSD) of the counter 42 is "0" or "1", to leading respectively.

When the average phase error between the input signal A and the output B of the oscillator 3 is E (E $\leq$ N$_1$/2), the value E is not necessarily obtained correctly responsive to the phase comparison of the respective clock intervals. Instead it deviates significantly. However, the mean value of the phase error supposedly approaches E, if a sufficiently large value is set for N$_2$, and the sum of phase errors for N$_2$ intervals becomes proximate to:

$$N_2 \cdot E$$

In other words, the content of the counter 42 of this embodiment becomes the mean value of the phase errors of N$_2$ intervals without any modifications.

When N$_1 = 2^5$ and N$_2 = 2^8$, the content of the counter 42 directly represents the mean value E, if there is a lagging status (MSD=0). If there is a leading status (MSD=1), the mean value E is represented by:

$$N_1 - (\text{the content of the counter 42})$$

However, the leading status may be considered as an extension of the lagging status. That is, the leading amount E may be represented as the lagging amount of:

$$2\pi - E$$

Therefore, if all the phase errors are reevaluated with the lagging amount, the content of the counter 42, in either leading or lagging, gives the mean phase error. The content of the counter 42, which is the mean phase error, is stored at a corresponding address in the memory circuit 6 immediately after the respective averaging interval is over. Memory 6 is read out immediately before the next burst arrives to be led to phase shift circuit 7.

In the embodiment of FIG. 2, the averaging circuit 4 comprises a two-stage counter for facilitating the construction of a divider circuit. It will be understood that a conventional divider circuit may be employed.

The control circuit 5 is driven by the output B of the oscillator 3. Circuit 5 generates the signal H to give the averaging interval for the averaging circuit 4, a write-in signal L, a read-out signal M, and an address designating signal N for the memory circuit 6. Such a control circuit 5 may include a frame counter 51 driven by the output B of the oscillator 3, decoders 52 to 54 for generating control signals H, L and M by decoding the output from the frame counter 51, based on a predetermined timing. A decoder 55 obtains an address signal N.

An oscillator 71 inside the phase shift circuit 7 has substantially the same frequency ($f_2 = N_1 \cdot f_1$) as the oscillator 24. The output Q of the oscillator 71 actuates a counter 72 having N$_1$ period. The counter 72 is reset by the output B of the oscillator 3. Accordingly, the content of the counter 72 represents the lagging amount, taken with respect to the output B of the oscillator 3. On the other hand, the output P of the memory circuit 6 represents the lagging amount of the input signal A, as compared to the output B of the oscillator 3; thus, the output P and the output R are led to a coincidence circuit 73. If outputs P and Q coincide with each other, the pulse generated at the coincident points becomes the recovery clock pulse which is being sought, and it is led to the output terminal 8 as a recovered output clock pulse S.

The operation heretofore described is now discussed in a greater detail with reference to the timing diagram of FIGS. 4A to 4H. FIG. 4A shows the clock component applied to the input terminal 1 of FIG. 2 (provided, however, that in this case the number of stations is limited to three); FIG. 4B shows the mean time of the averaging circuit 4 of FIG. 2; FIG. 4C shows the write-in control signal L for the memory circuit 6 shown in FIG. 2; FIG. 4D shows the memory content stored at the address designated for the burst transmitted by a first station in the memory circuit 6 of FIG. 2; FIG. 4E shows the memory content stored at the address designated for the burst transmitted from a second station;

FIG. 4F shows the memory content stored at the address designated for the burst from a third station; FIG. 4G shows the read-out control signal M for the memory circuit 6 in FIG. 2; and FIG. 4H shows the phase of the output signal S of the clock recovery circuit, which is the output of the phase shift circuit 7 of FIG. 2.

FIG. 4A shows an example of bursts from each of the three stations, with the bursts being repeated over a predetermined period. The character A-b is assumed to represent the clock component of the b-th burst from the A-th station (A:1, 2 and 3, and b is a positive integer). In FIG. 4B, the thick lines indicate the mean time of the averaging circuit 4, represented by the output H of the control circuit 5 in FIG. 2. The character TA-b is assumed to show the averaging time for the b-th burst from the A-th station. The reference character TA-b indicates that the averaging is performed over most of the length of each burst received; however, it is possible to make an arbitary selection within the burst length corresponding to the particular time period. The character TA-b may extend over a plurality of bursts transmitted by the same station. FIG. 4C is the write-in control signal L for the memory circuit 6, which is the output of the control circuit 5 of FIG. 2. Since the timing of signal L has been selected at the time when the averaging is completed, the output J of the averaging circuit 4 is written into the memory 6 at the address denoted by the output N of the control circuit 5, but only after the averaging has been completed.

FIGS. 4D to 4F respectively show the memory contents stored in the memory circuit 6 at the address corresponding to the 1st, 2nd and 3rd stations. The reference character MA-b represents the memory content stored in circuit 6 for the b-th burst from the A-th station. In other words, FIG. 4D indicates the memory content stored in the memory circuit 6 at the address corresponding to the burst from the 1st station, and M1-1, M1-2, M1-3 respectively indicate that only the phase differences averaged in respect of the 1st burst, 2nd burst, and 3rd burst, transmitted from the 1st station are stored. FIG. 4G shows the read-out control signal M for the memory circuit 6, which is the output of the control circuit 5 in FIG. 2. The timing of control signal M is selected to be between the two successive bursts, i.e., between after the preceding burst is completed and before the ensuing burst begins.

Therefore, the memory content stored in the memory circuit 6 is taken from the address indicated by the output N of the control circuit 5, as the output P, which is supplied to the phase shift circuit 7. The phase of the output signal S of the clock recovery circuit is the output of the phase shift circuit 7, as shown in FIG. 4H. The character PA-b represents the phase corresponding to the phase information obtained from the b-th burst from the A-th station.

As is clear from FIGS. 4A-4H, the phase for the output clock pulses S, for each of the bursts, is the phase obtained from the preceding burst from the same station. This phase is maintained while one burst continues. Thus, since the timing information of the preceding burst is used for the ensuing burst, the same operation is performed even when there are differences between the clock frequencies of the respective bursts and the frequency of the oscillator 3, if the clock phase shift in time interval between bursts from the same station is very small.

Although the number of participating stations is assumed to be three, in this embodiment, it will be understood that a wholly similar operation is possible with M stations (wherein M is a positive integer) as long as the memory capacity corresponding to the number of stations is provided at the memory circuit 6. In the present embodiment, the explanation is given by limiting the averaging time for the averaging circuit 4. However, it is possible for the averaging operation to extend over a plurality of bursts issued from the same station. If a number of bursts are averaged, other bursts would exist within the same averaging time. Therefore, it is necessary to add to the averaging circuit 4 the function of temporarily storing the value in the memory circuit 6 at the time when the averaging of one burst is completed. Then, the circuit reads out the value when another burst from the same station arrives, to continue the averaging operation without interruption.

It is assumed that the phase comparator 21 in FIG. 2 is of the type which would produce signals F and G representing the phase lag and lead, depending on the input signals. It is, however, possible to use a phase comparator of the type wherein the phase difference is represented only by the lagging amount, taken with respect to the output B of the oscillator 3. In this case, the output from the phase comparator 21 becomes signal D, alone. The up-down counters 41 and 42 in the averaging circuit 4 may be of any suitable and conventional type. The output from the phase difference detection circuit 2 is obtained by gating the output E of the oscillator 24. The actual counter (41 or 42) may be provided with a gate function, within the counter, in which case it may be that no gates 22 and 23 are provided. One oscillator may be shared as the oscillator 24 for the phase difference detection circuit 2 and oscillator 71 for the phase shift circuit 7. The oscillator 3 is provided independently, in this embodiment, although the output B may be obtained by counting down the output of either oscillator 24 or oscillator 71 to $1/N_1$. In this case, the counter 72 may be used also as a counter for counting down.

As has been described hereinabove, the present invention offers a recovery of the clock pulse with a sufficient reliability, from the time the bursts begin to arrive, because the phase difference information is obtained from the bursts which have arrived previously and is used for the clock recovery. Since the averaging time may be determined without considering the synchronous transient time for the clock recovery circuit, the recovered clock pulses are expected to have a sufficiently high S/N. Accordingly, the clock pulse recovery circuit, according to the present invention, ensures a burst communication system such as TDMA with an extremely high bit rate.

What is claimed is:

1. A clock pulse recovery circuit comprising: oscillator means having a frequency substantially equal to clock frequencies of signal bursts issued by more than one transmitting station; phase difference detection circuit means for detecting phase differences between a clock signal extracted from each of said bursts and an output from said oscillator means; averaging circuit means for averaging the phase differences detected during a predetermined interval, said predetermined interval being shorter than the interval of at least one burst received from the same station; memory circuit means for storing the averaged phase difference in response to a write-in control signal and for reading out the stored phase difference in response to a read-out control signal; control circuit means responsive to the output of said oscillator means for generating a first control signal designating said predetermined interval, said write-in control signal being at the end of said predetermined interval, and said read-out control signal being at the beginning of each of said bursts; and phase shift circuit means for phase-shifting the output from said oscillator responsive to the phase difference read out of said memory circuit means and thereby generating a recovery clock pulse signal, the clock frequency of the first burst corresponding to said stored phase difference being used as the clock signal for a second burst from the same station which transmitted said first burst, said second burst occurring at least one burst after said first burst.

2. A method of recovering clock pulses from a stream of time division multiple access signals, said method comprising the steps of:
 a comparing the phase of a signal generated locally with the phase of burst signals received from various transmitting stations in a multiple access system;
 b averaging the phase differences detected in said comparison step;
 c storing information of the average phase differences under addresses which individually identify transmitting stations in said system;
 d reading the stored information out of the memory area corresponding to one of the burst signals transmitted from any given station; and
 e phase-shifting said signal generated locally, in response to the read signal of said read-out step, to provide a clock pulse for the next burst signal transmitted from the same given station.

3. The method of claim 2 wherein step b includes the added step of counting up or counting down responsive to said compared phases of step a.

4. The method of either claim 2 or claim 3 wherein step e includes the added step of bringing a local oscillator into coincidence with said stored information.

* * * * *

UNITED STATES PATENT AND TRADEMARK OFFICE
CERTIFICATE OF CORRECTION

PATENT NO. : 4,339,817
DATED : July 13, 1982
INVENTOR(S) : HATA, et al.

It is certified that error appears in the above—identified patent and that said Letters Patent is hereby corrected as shown below:

Col. 1, Line 5, "unit" should be --circuit--;

Col. 1, Line 34, insert --with-- after "pulses".

Col. 2, Line 46, insert a comma --,-- after "A";

Col. 2, Line 47, delete the comma "," (second occurrence).

Col. 6, Line 18, insert --output-- after "produce".

Signed and Sealed this

Thirtieth Day of November 1982

[SEAL]

Attest:

GERALD J. MOSSINGHOFF

Attesting Officer  Commissioner of Patents and Trademarks